United States Patent [19]

Buchholz

[11] Patent Number: 5,501,720
[45] Date of Patent: Mar. 26, 1996

[54] SPRAY-DRIED UREA-FORMALDEHYDE AND LIGNOSULFONATE COMPOSITIONS

[75] Inventor: Richard F. Buchholz, Shelton, Wash.

[73] Assignee: Georgia-Pacific Corporation, Atlanta, Ga.

[21] Appl. No.: 258,821

[22] Filed: Jun. 13, 1994

[51] Int. Cl.$^6$ ....................................................... C05C 9/02
[52] U.S. Cl. ........................... 71/28; 71/64.04; 71/64.07; 71/64.11; 71/64.13; 564/3
[58] Field of Search ........................... 71/28–30, 64.04, 71/64.07, 64.11, 64.13; 564/63, 3

[56] References Cited

U.S. PATENT DOCUMENTS

| | | | |
|---|---|---|---|
| 2,622,979 | 12/1952 | Keim | 162/167 |
| 2,766,283 | 10/1956 | Darden | 564/59 |
| 2,845,397 | 7/1958 | Mills | 525/138 |
| 3,076,772 | 2/1963 | Christ | 523/129 |
| 3,180,787 | 4/1965 | Adams | 162/163 |
| 3,697,245 | 10/1972 | Duday | 71/28 |
| 3,725,029 | 4/1973 | Blackmore | 71/28 |
| 3,915,911 | 10/1975 | Horiguchi | 524/73 |
| 4,076,581 | 2/1978 | Avis | 162/167 |
| 4,098,770 | 4/1978 | Berchem et al. | 525/480 |
| 4,105,606 | 8/1978 | Forss et al. | 524/73 |
| 4,130,515 | 12/1978 | Bornstein | 527/400 |
| 4,194,997 | 3/1980 | Edler | 156/335 |
| 4,209,427 | 6/1980 | Williams | 524/72 |
| 4,244,846 | 1/1981 | Edler | 524/14 |
| 4,277,253 | 7/1981 | Walter et al. | 23/313 R |
| 4,324,747 | 4/1982 | Sudan et al. | 264/13 |
| 4,424,300 | 1/1984 | Udvardy et al. | 525/501 |
| 4,587,358 | 5/1986 | Blouin et al. | 564/3 |
| 4,708,967 | 11/1987 | Ferentchak et al. | 521/56 |
| 4,752,317 | 6/1988 | Detroit | 71/28 |
| 4,756,738 | 7/1988 | Detroit | 71/27 |
| 4,789,391 | 12/1988 | Detroit | 71/27 |
| 5,032,164 | 7/1991 | Sanford et al. | 71/64.07 |

FOREIGN PATENT DOCUMENTS 1096265  3/1981  U.S.S.R. .
1151532  4/1985  U.S.S.R. .

OTHER PUBLICATIONS

Yamato Advertisement entitled "The Latest Development in Laboratory Spray Drying Technology—Spray Dryer Model DL-41", No Date.

Krutko et al., "The Effect of Mixtures of Lignosulfonates and Urea–Formaldehyde Resins on the Properties of Granulated KCl", *Zh. Prikl. Khim.*, 1987, pp. 718–721 (with translation).

Mozheiko et al., "Use of Modified Lignosulfonates for Manufacture of Slow Release Potassium Fertilizers" (with translation) No Date.

Vorob'eva et al., "The Effect of Salt Media on the Lignosulfonate Urea Formaldehyde Resin Polycomplex", *Vestii Akad. Navuk BSSR Sec. Khim. Navuk (VBSKAK)*, 1989, pp. 96–100 (with abstract and full translation).

Krutko et al., "Effect of Lignosulfonates Modified with Urea on Properties of Granulated Potassium Fertilizer", *Zh Prikl. Khim.*, 61(2):394–7 (1988), English Abstract Only (Chem. Abs. 108(21):185703W).

Zeman et al., "Production of Urea–Formaldehyde Condensates for Fertilizers and Blowing Agents", Chem. Abs. 108(24):205737ryM, 1987.

Milichovsky et al., "Slow–Acting Organomineral Liquid or Solid Fertilizers Containing Lignin", Chem. Abs. 99(7):52495d, 1983.

Beat Myer, *Urea–Formaldehyde Resins*, Chapter 8, pp. 207–210, Addison–Wesley Publishing Company, Reading, Massachusetts, 1979.

*Primary Examiner*—Ferris Lander
*Attorney, Agent, or Firm*—Banner & Allegretti, Ltd.

[57] ABSTRACT

A delayed release fertilizer composition consisting essentially of a mixture of a urea-formaldehyde resin and a lignosulfonate prepared by spray-drying an aqueous mixture of a urea-formaldehyde resin and a lignosulfonate. The composition of this invention, is also use as a fertilizer carrier as a replacement for expanded vermiculite fertilizers.

6 Claims, No Drawings

SPRAY-DRIED UREA-FORMALDEHYDE AND LIGNOSULFONATE COMPOSITIONS

BACKGROUND OF THE INVENTION

1. Field of the Invention

This invention relates in general to a spray-dried composition prepared by spray drying a mixture of a urea-formaldehyde resin and a lignosulfonate, to the method of preparing the composition, to fertilizers containing the compositions and to the method of preparing such fertilizers. The composition of this invention is useful as a delayed release fertilizer and is also useful as a fertilizer carrier, as a replacement for expanded vermiculite-based fertilizers.

2. Description of Related Art

Slow release nitrogen fertilizers based on urea-formaldehyde resins are known in the art. For example, Darden, U.S. Pat. No. 2,766,283 describes fertilizer compositions based on urea-formaldehyde resins. The urea and formaldehyde are reacted in the presence of water, and at the conclusion of the reaction, the product is neutralized and separated by filtration, by centrifuging, or by another suitable method. Darden does not disclose spray-drying the urea-formaldehyde resin fertilizer composition and does not disclose the use of a lignosulfonate in the composition.

It is also known that lignosulfonate and urea-formaldehyde compositions can be used to improve the wet-strength of paper. Keim, U.S. Pat. No. 2,622,979 disclose lignin sulfonate-modified urea-formaldehyde resins prepared by reacting urea-formaldehyde and a lignin sulfonate under controlled conditions. This modified resin then is incorporated into a paper stock and improves the wet-strength properties of the subsequently produced paper. The lignin sulfonate-modified urea-formaldehyde resin of Keim is not spray-dried and is not disclosed to be useful as a fertilizer or fertilizer carrier.

Mills, U.S. Pat. No. 2,845,397, teaches that when Kraft lignin is treated with urea, or derivatives of urea, and formaldehyde prior to mixing with a rubber latex and coagulating, rubber products having improved abrasion resistance are produced. The so-modified lignin composition is mixed with an alkaline rubber latex and the treated lignin and rubber coagulate is recovered by spray-drying or coprecipitating. Mills does not disclose preparing a spray-dried mixture of a lignosulfonate and a urea-formaldehyde resin for use as a fertilizer or fertilizer carrier.

Christ, U.S. Pat. No. 3,076,772, discloses an alkaline resinous adhesive comprised of urea, phenol and formaldehyde reacted in the presence of an alkali metal base catalyst such as sodium hydroxide. The phenol-urea-formaldehyde resin then is reacted with a sulfite waste liquor, such as lignosulfonate, and the resulting composition is used in making particleboard.

Bornstein, U.S. Pat. No. 4,130,515, discloses a process for preparing a thermosetting resin composition which comprises copolymerizing a lignosulfonate salt, melamine, and an aldehyde. The resin prepared by Bornstein is useful in binding consolidated cellulosic particles to form a board-like product. Edler, in U.S. Pat. Nos. 4,194,997 and 4,244,846, discloses adhesive compositions comprising mixtures of urea-formaldehyde resins and lignosulfonate useful in the production of particleboard.

Finally, Detroit, in U.S. Pat. Nos. 4,752,317, 4,756,738 and 4,789,391, discloses lignosulfonate-acrylonitrile graft copolymers which provide slow release of urea fertilizers.

The patents to Detroit disclose that the fertilizer may be modified to provide controlled nutrient release by controlling the solubility of the fertilizer.

An article by Vorob'eva titled "The Effect of Salt Media on the Lignosulfonate Urea Formaldehyde Resin Polycomplex" describes experiments demonstrating the use of a urea-formaldehyde resin, and its mixture with lignosulfonate, to produce granulated potassium chloride fertilizers. Use of the resin provides improved granule strength and slow release properties. The lignosulfonate and urea-formaldehyde compositions in the Russian paper are dried either at room temperature, or in an oven at 110° C. The Russian article does not disclose a spray-dried lignosulfonate and urea-formaldehyde composition.

DESCRIPTION OF THE INVENTION

The invention comprises an insoluble urea-formaldehyde resin and lignosulfonate composition prepared by spray-drying an aqueous mixture of lignosulfonate and a water-soluble, or at least a stable water-dispersible, urea-formaldehyde resin. The composition of this invention is useful as a fertilizer per se, having delayed release characteristics, or as a fertilizer carrier, serving as a replacement, for example, for expanded vermiculite fertilizers. Insoluble, spray dried compositions of the invention containing a urea-formaldehyde resin and a lignosulfonate have the ability to absorb a significant amount of water without degrading the flowability of the composition, i.e. without caking. Compositions of this invention also have desirable dry bulk and wet bulk densities, particularly as compared to dry compositions containing a mixture of a lignosulfonate and urea-formaldehyde resin which were not prepared by spray-drying techniques.

The present invention is based on the discovery that upon spray-drying, aqueous compositions consisting essentially of a mixture of a lignosulfonate and a water-soluble urea-formaldehyde resin, or at least a water-dispersible urea-formaldehyde resin, become water insoluble and useful as a slow-release fertilizer. The particles of the spray-dried composition have a porosity sufficient to absorb a significant amount of water without caking, which makes the material useful as a fertilizer carrier.

Fertilizers according to the present invention can be made using one of two alternative embodiments. In a first approach, fertilizer compounds, particularly fertilizer nutrients, and other desired adjuvants can be incorporated into an aqueous mixture of a urea-formaldehyde resin and a lignosulfonate before spray drying to make a slow-release fertilizer product having the desired ultimate fertilizer composition. Upon spray-drying, the water-soluble mixture of urea-formaldehyde resin, a lignosulfonate, and other materials becomes a water-insoluble powder, thus giving the composition delayed release characteristics. The spray-dried product of this invention not only is a free-flowing powder, but also is able to absorb up to 50% by weight water without losing its free-flowing characteristics, i.e. without caking.

In an alternative approach, fertilizer nutrients can be incorporated into a previously spray-dried composition of the present invention by absorption of an aqueous solution of such nutrients on the spray-dried powder. In this way, the spray-dried composition of the invention functions much like expanded vermiculite carriers of the prior art.

The spray-dried powder of this invention produced via either approach can also be pelletized or granulated using known techniques. Granulation of the spray dried powders produces strong beads.

Lignin is recovered in the paper industry as a by-product from waste pulping liquors obtained by processing cellulosic materials such as wood, straw, corn stalks, baggasse, and the like. Lignin is a polymeric substance of substituted aromatics which is the essential binder in trees, and vegetable tissue associated with cellulose and other plant constituents. While there is some variation in the chemical structure and in the nature of other constituents found in the plant depending on the type of plant, place where the plant is grown, and also upon the method used to recover or isolate the particular constituents from the plant tissue, the basic structure and properties of these materials are similar and upon sulfonation form a well-known group of water-soluble materials known as lignosulfonates or sulfonated lignin. The lignosulfonate used in the present invention can be either a sulfonated lignin made by sulfonating alkali lignin made by an alkaline pulping process such as the Kraft process or more preferably is a water-soluble sulfonated lignin recovered directly from the spent pulping liquor of the sulfite pulp process. The reactions and properties of lignosulfonates and lignin are covered in the text, *The Chemistry of Lignin*, by F. E. Brauns et al., Academic Press, New York, N.Y. (1960).

One of the main sources of sulfonated lignin is the residual pulping liquors obtained in the pulp and paper industry using the sulfite pulping process. In the sulfite pulping process, lignocellulosic material is digested with a sulfite or bisulfite to sulfonate (solubilize) the lignin and obtain a residual product commonly referred to as "spent sulfite liquor" containing the water-soluble sulfonated lignin. In other alkaline paper-making processes, the residual pulping liquor or lignin as obtained from the process may not be a water-soluble sulfonated product. However, the residual liquors or products containing the lignin portion may be sulfonated by the various known methods to the degree needed to produce a water soluble sulfonated lignin material.

Spent sulfite liquor or other sulfonated lignin products obtained upon sulfonation of residual pulping liquors generally contain other constituents beside sulfonated lignin or lignosulfonates. Such lignin products may contain carbohydrates, degradation products of carbohydrates, and resinous materials as well as other organic and inorganic constituents. Although these non-lignin constituents may be removed, in the context of the present invention it is not necessary to do so. In this regard, the lignosulfonates or products containing the lignosulfonates may be subjected to different treatments such as acid treatment, alkaline or heat treatment, oxidation or fermentation to remove or modify some of the non-lignin constituents or for other purposes. Generally, the basic phenolpropane polymeric structure of the lignin constituents and properties and characteristics of these products are not destroyed unless the treatment is unusually severe. The treated or nontreated lignin products also may be fractionated to obtain a particular lignosulfonated fraction or polymerized to increase its molecular weight.

In the present application, the lignin source for obtaining the lignosulfonate may be any common cellulosic material including hardwoods and softwoods and may be either crude or pure. Lignin recovered from the preparation of paper grade quality pulp is suitable. The lignosulfonate employed according to the present invention is usually in a salt form generally based on an alkali metal or alkaline earth metal such as sodium, potassium, calcium, magnesium or ammonium. Preferred lignosulfonate salts are the calcium and ammonium lignosulfonate salts.

In accordance with the invention, the water-soluble lignosulfonate is mixed with an aqueous urea-formaldehyde resin (the resin is at least water dispersible but preferably is itself water-soluble) to form a uniform (homogeneous) mixture before spray drying. Urea-formaldehyde resins used in the present inventions are characterized by a particular formaldehyde to urea mole ratio (F/U) and solids content. In the broad practice of the present invention, any urea-formaldehyde composition containing adducts of urea and formaldehyde and only a small amount of unreacted urea species, typically less than 5 weight % urea monomer, and having a formaldehyde to urea mole ratio of from about 1:1 to about 6:1 can be used in the present invention. The solids content of suitable urea-formaldehyde generally is at least about 30 weight %. More specifically, to minimize the level of water removal required during the spray dry process, the solids content is preferably about 40 weight % or higher, and usually about 60 weight %. The upper limit for the solids content of the urea-formaldehyde resin before spray-drying depends on the nature of the resin itself, including its mole ratio and molecular weight. The solids content cannot be so high that the solution cannot be pumped through the spray dryer equipment.

The formaldehyde to urea mole ratio and the solids content of the resin must be such that the resultant spray-dried product of the aqueous mixture of urea-formaldehyde resin and lignosulfonate produces a water insoluble powder. Typically, the F/U mole ratio of the urea-formaldehyde resin used to prepare compositions of the present invention is within the range of from about 1:1 to about 4:1. More specifically, the F/U mole ratio of the urea-formaldehyde resin preferably is within the range of from about 1:1 to about 3:1.

The urea-formaldehyde resin itself can be prepared using any of the known procedures for making such resin compositions. Generally, an aqueous, water-soluble urea-formaldehyde resin is prepared under mildly alkaline reaction conditions.

The relative amount of lignosulfonate solids to urea-formaldehyde resin solids used to form the homogenous aqueous mixture for spray drying also can be varied to a certain extent provided that, upon spray-drying, the mixture produces an insoluble, freely flowing powder. Typically, the urea-formaldehyde resin solids and lignosulfonate solids are supplied in at least about a 1:1 weight ratio. The desirable water absorption property of the insoluble spray dried powder generally tends to increase as the weight ratio of urea-formaldehyde resin solids to lignosulfonate solids is increased. The weight ratio of urea-formaldehyde resin solids to lignosulfonate solids can vary from about 1:1 to about 15:1, and more particularly varies between about 1:1 to about 10:1.

As noted above, in one preferred approach, other fertilizer constituents also are included in the aqueous solution of the urea-formaldehyde resin and lignosulfonate before spray drying. Fertilizer constituents which can be added to the aqueous mixture of urea-formaldehyde resins and lignosulfonate include, for example, water-soluble potassium sources, such as potassium hydroxide, potassium chloride and potassium sulfate and water-soluble phosphates, such as phosphoric acid, diammonium phosphate, superphosphate and the like. Trace minerals such as boron, manganese, copper, zinc, molybdenum and iron salts also can be added.

The spray-dried powder then can be used as is or often it is more desirable to pelletize or granulate the powder to provide an ultimate slow-release fertilizer product. Skilled practitioners in the art will recognize how to pelletize and granulate the spray-dried powder of the present invention as these operations are well known in the art. For example, the spray dry powder can be compacted, pelletized (California pellet mill), drum granulated, pan granulated or put through a pug mill, using a known binder.

As previously noted, spray dried urea-formaldehyde and lignosulfonate compositions of the present invention also are useful as a fertilizer carrier, for example serving as a replacement for expanded vermiculite. In such instances, an aqueous solution containing the proper amount of fertilizer nutrients can be prepared and then is applied to the spray-dried powder of the subject invention. The fertilizer solution can be applied to the powder by spraying it onto the powder, or by adding the spray-dried powder to an aqueous bath of the fertilizer solution.

As indicated above, the spray-dried powder of the present invention possess a high water absorption characteristic yet retains excellent flowability (resists caking). Typically, the spray-dried powder of the present invention can absorb at least about 50% of its weight in water without degrading the flowability of the powder. The powder also exhibits desirable dry and wet bulk densities. Dry bulk densities of the spray-dried compositions of the present invention typically range from about 2.5 ml/g to about 6.0 ml/g, while wet bulk densities of the spray-dried powders may typically range from about 4.7 ml/g to about 8.6 ml/g. The procedures for determining these properties are described in the Examples.

Spray drying in accordance with the present invention is typically carried out with pressure nozzles or centrifugal atomizers operating at speeds of up to 10,000 to 16,000 RPM or more. Commercial sources of such spray drying equipment are well known to those skilled in the art. At these speeds, one milliliter of liquid feed can be converted to over 100 million fine droplets. Despite this high velocity generation of droplets, the spray dryer preferably is designed so that the droplets do not contact the spray dryer wall under proper operating procedures. This effect is achieved by a precise balance of atomizer velocity, air flow, spray dryer dimensions of height and diameter, and inlet and outlet means to produce a cyclonic flow of air in the chamber. This highly specialized art is clearly to be distinguished from the random and promiscuous spraying of liquid droplets such as one might do with a garden hose. The process of spray drying is well known to those skilled in the art.

A spray dryer for use in connection with the present invention preferably is operated at a dryer air inlet temperature of about 230° C. and an outlet temperature of about 110° C. The atomizer is typically set to operate at a flow ratio of the aqueous mixture flow rate to dryer and collection air flow rate of about $10^{-5}$ to 1. More specifically, the inlet temperature of the dryer air feed to the spray dryer can vary in the range from about 220° C. to about 250° C., and preferably from about 225° C. to about 235° C. The outlet temperature generally varies from about 100° C. to about 110° C.

The following examples further illustrate the practice of the subject invention and are not intended as a limitation on the claims thereof.

EXAMPLES

In all the following examples, spray dried compositions were prepared using a Yamato spray dryer Model DL-41.

Example 1

In this example an aqueous mixture of 130 grams of a 50 weight % aqueous solution of calcium lignosulfonate (LIGNOSITE®50, available from G-P), and 100 grams of an aqueous urea-formaldehyde (UF) resin was prepared. The UF resin had been prepared at a 2.35 F/U mole ratio by first reacting about 44 parts of a commercially available UFC concentrate (STAFORM®60) with about 22 parts of a 50% by weight aqueous formaldehyde solution in the presence of about 10 parts aqua-ammonia (28% ammonium hydroxide), followed by further reaction at an alkaline pH with sufficient urea to provide the final F/U mole ratio. The UF resin had a final solids concentration of about 60% by weight. The resin contained less than about 2.0 weight % unreacted urea monomer. To this mixture sixty grams of water were added in which 13 grams of ammonium sulfate had been dissolved.

The mixture was then spray dried to produce a fertilizer carrier composition. The spray dryer was operated at an inlet gas temperature of 250° C., and a gas outlet temperature of 105° C. The flow rate of aqueous mixture contain UF resin and lignosulfonate and having a solids content of about 46 weight per cent was maintained at about 10 ml/min and the atomizer pressure was set at 3 kg/cm$^2$. The flow rate of dryer collection air was set at 0.7 m$^3$/min. The mixture sprayed with some difficulty as it tended to collect on the spray nozzle.

Example 2

Example 1 was repeated except that the solution was spray dried at a lower solids content and in the presence of a lower amount of ammonium sulfate. To prepare the mixture for spray drying an aqueous solution containing 6 grams of ammonium sulfate in 120 grams of water was used. The solids content of the mixture flowed to the spray drier was 36.8% by weight. The mixture sprayed with much less difficulty than the aqueous mixture of Example 1.

Example 3

Example 2 was repeated except that no ammonium sulfate was added to the aqueous mixture before spray drying. The total solids content of the mixture flowed to the spray drier was 35.7% by weight.

All three spray-dried products were insoluble in water, and were able to absorb over 50% of their weight in water. The dry bulk densities of the spray-dried powders are reported below in Table 1.

TABLE 1

| Example | Density (lb/ft$^3$) |
|---------|---------------------|
| 1       | 15                  |
| 2       | 10.2                |
| 3       | 10                  |

Example 4

A fertilizer composition was prepared by spray drying an aqueous mixture of 13.3 grams of LIGNOSITE® 17 (a 47.6% by weight aqueous solution of ammonium lignosulfonate), 158.4 grams of an aqueous urea/formaldehyde resin containing about 55% by weight resin solids and less than 5% by weight urea monomer, about 5 grams of a 85% by weight phosphoric acid solution, about 4 grams of potassium hydroxide and 72 grams of water. The potassium hydroxide was added as pellets to the 72 grams of water to which the phosphoric acid was added. The aqueous solution for spray drying had a solids content of about 40 weight % and a pH of 5.9, which was adjusted to 5.0 with dilute phosphoric acid. The UF resin was prepared by first reacting, in the presence of ammonium hydroxide, a UFC concentrate (STAFORM® 60) with sufficient formaldehyde to provide a F/U mole ratio of about 3.2, and thereafter adding sufficient urea to reduce the F/U mole ratio to about 1.6 and completing the reaction at an alkaline pH. The aqueous solution spray-dried very well and the resulting powder was insoluble in water. The powder contained about 6% lignosulfonate and had a bulk density about 30–35 lb/ft$^3$.

Example 5

The procedure of Example 4 was repeated except that the aqueous solution which was spray dried contained 29 grams of LIGNOSITE® 17, 122 grams of an aqueous UF resin having a solids content of about 65 weight % and less than about 1 weight % free urea monomer, about 5 grams of a 85% by weight phosphoric acid solution, about 4 grams of potassium hydroxide and 91 grams of water. The aqueous solution for spray drying had a solids content of about 40% by weight and a pH about 6.0. The UF resin was prepared by first reacting formaldehyde with sufficient urea to provide a F/U role ratio of about 2.5 under an acidic pH, followed by reaction at a slightly alkaline pH with sufficient additional urea to lower the F/U role ratio to about 1.1. Spray drying the aqueous solution proceeded similarly to Example 4. The recovered powder contained about 14% by weight lignosulfonate and had a similar bulk density to the product of Example 4.

Example 6

Example 5 was repeated except the pH of the aqueous solution to be spray dried was adjusted from 6.0 to 4.8 with dilute phosphoric acid. Results were similar to Example 5.

In the following examples, compositions containing a mixture of a urea-formaldehyde resin and a lignosulfonate were made in accordance with the previously identified Vorob'eva article.

Example 7 (Comparative)

Fifty grams of a calcium spent sulfite liquor containing about 50% by weight solids was mixed with 50 grams of the same UF resin used to prepare the product of Examples 1 to 3. The solution was heated in an oven at 110° C. for 18 hours and a solid product was recovered.

Example 8 (Comparative)

Comparative Example 7 was repeated except that 275 ml of a 2.5M potassium chloride solution was added to the aqueous mixture of lignosulfonate and UF resin before drying. About 25 grams of insoluble precipitate formed separate from a clear supernatant. The insoluble material was split into two parts. One part was dried at room temperature (Example 8A), and the other part was dried at 110° C. (Example 8B). The insoluble material first melted on heating, and then separated into what appeared to be white gels about 3–5 mm in diameter and a dark liquid. The clear supernatant solution also was divided into two equal portions of about 175 ml each. One part was dried at room temperature, yielding a very non-uniform solid product which contained KCl crystals (Example 8C). The solids content of the other fraction was recovered by drying at 110° C. (Example 8D).

Example 9 (Comparative)

A solution prepared by blending ten grams of calcium spent sulfite liquor containing 50% by weight solids, 10 grams of the UF resin of Examples 1–3 and 10 ml of a 2.5M KCl solution was oven-dried at 110° C. The mixture separated into light and dark layers of dried product.

Example 10 (Comparative)

A solution prepared by blending 25 grams of calcium spent sulfite liquor having 50% by weight solids and 25 grams of the UF resin used in Examples 1–3 was dried at room temperature and a solid product was recovered.

In the following Examples 11–13 the spray dryer was operated under the following conditions: atomizing air pressure at 1.2 kg/cm$^2$, drying flow air at 0.8 m$^3$/min., an inlet air temperature of about 210° C., and an outlet temperature of about 110° C. The solution was spray dried at a rate of about 5 ml/min.

Example 11

Using the spray drying conditions noted above, a 50:50 weight mixture of UF resin and lignosulfonate as used in Comparative Example 1 was spray dried at an initial solids concentration of 55% to yield a solid product.

Example 12

An aqueous solution containing 75 grams of the UF resin of Example 1 to 3, 75 grams of a 50 weight % calcium spent sulfite liquor and 75 grams of a 2.5M KCl solution was spray-dried as above. A solid product was recovered.

Example 13

An aqueous solution containing 30 grams of the UF resin of Examples 1–3, 60 grams of a 50% by weight calcium spent sulfite liquor and 40 grams of water was spray-dried as above except that the flow rate of solution to the spray dryer was reduced to 3 ml/min. A solid product was recovered.

Determination of Dry and Wet Volumes

All of the room temperature and oven-dried samples of Examples 8–10 were ground with a coffee mill before testing. Samples were put into a 10 ml graduated cylinder with light tamping to three milliliters volume, and the weight of the material was recorded as the dry bulk density (ml/g). The spray-dried products were oven-dried before testing their dry bulk density. Once the dry bulk density was measured, water was added to the graduated cylinders to the 10 ml mark, and the wet volume measured after sitting overnight. The samples were stirred once after one-half hour, and the results are shown in Table II.

Water Absorption Properties

Water was added to 3 grams of each of the product samples in one-half gram increments with good mixing until the samples reached a sticky paste consistency or until free water was evident. The absorption characteristic is reported as the volume of water (ml) needed to reach such condition. The data is reported in Table II.

TABLE II

Dry and Wet Volumes and Water Absorption Properties
of UF Resin/Calcium Lignosulfonate Insoluble Products

| Example | KCl | Drying Conditions | Bulk Density (ml/g) Dry | Wet | Absorb. (ml/3 g) |
|---|---|---|---|---|---|
| 7  | No  | 110° C.   | 1.1 | 1.6 | 1–1.5 |
| 8  | Yes | RT        | 1.2 | 1.7 | 1–1.5 |
| 8B | Yes | 110° C.   | 1.4 | 3.4 | 1–1.5 |
| 8C | Yes | RT        | 1.1 | 1.5 | 0.5–1 |
| 8D | Yes | 110° C.   | 0.9 | 0.9 | 1–1.5 |
| 9  | Yes | 110° C.   | 1.2 | 1.2 | 1–1.5 |
| 10 | No  | RT        | 1.4 | 2.2 | 0.5–1 |
| 11 | No  | Spray-Dry | 3.1 | 4.7 | 4–4.5 |
| 12 | Yes | Spray-Dry | 2.5 | 5.6 | 7–7.5 |
| 13 | No  | Spray-Dry | 6.0 | 8.3 | 7–7.5 |
| 3  | No  | Spray-Dry | 6.0 | 8.6 | 8.5–9 |

As seen from Table II, samples made by the procedures described in the Vorob'eva article yield materials that clearly differ from those made by spray-drying. Importantly, the spray-dried compositions of the present invention exhibited absorption characteristics 4 to 8 times greater than the room or oven dried products. Additionally, the dry bulk density of spray-dried composition was 2 to 5 times greater, and the wet bulk density was 5–9 times greater than the compositions dried at room temperature or in an oven.

The following examples further illustrate the superiority of spray-dried urea-formaldehyde and lignosulfonate compositions as compared to those prepared by room temperature or oven drying over a range of urea-formaldehyde to lignosulfonate weight ratios.

Example 14 (Comparative)

Calcium spent sulfite liquor (5 g) and 50 grams of the UF resin of Example 1 were heated in an oven at 110° C. for 18 hours until dry.

Example 15 (Comparative)

Calcium spent sulfite liquor (5 g) and 50 grams of the UF resin of Example 1 were dried at room temperature.

Example 16 (Comparative)

Calcium spent sulfite liquor (6 g) and 30 grams of the UF resin of Example 1 were heated in an oven at 110° C. for 18 hours.

Example 17 (Comparative)

Calcium spent sulfite liquor (6 g) and 30 grams of the UF resin of Example 1 were dried at room temperature.

Example 18 (Comparative)

Calcium spent sulfite liquor (10 g) and 100 grams of the UF resin of Example 1 were mixed and 300 ml of 2.5M KCl solution were added which resulted in the formation of a precipitate and a clear supernatant. About 3.9 grams of insoluble material were recovered on drying at 110° C.

Example 19 (Comparative)

The clear supernatant of Comparative Example 18 was divided. One part was dried at 110° C. (Sample 19A), and the other part was dried at room temperature (Sample 19B).

As Sample 19B was dried, KCl crystal growth was observed and a very non-uniform product was recovered.

The spray dryer conditions for the following Examples 20 and 21 were as follows: atomizing air pressures 1.2 kg/cm$^2$; drying air flow 0.8 m$^3$/min; air heater setting at 230° C.; inlet drying air temperature at 210° C.; outlet gas temperature was about 110° C.; and flow rate of the aqueous mixture was about 4 ml/min.

Example 20

The urea-formaldehyde resin of Example 1 (50 g), 5 grams of calcium spent sulfite liquor and 25 gms of water were spray-dried at the noted conditions and free flowing powder was recovered.

Example 21

The UF resin of Example 1 (50 g), 10 grams of calcium spent sulfite liquor and 25 grams of water were spray-dried at the noted conditions and a powder was recovered.

Determination Of Dry and Wet Volumes

All of the room temperature and oven-dried samples were ground with a coffee mill before testing. Samples were put into graduated cylinders with light tamping to three milliliters volume, and the weight of the material (dry bulk density) was recorded as dry (ml/g) in Table III. The spray-dried products were oven-dried before testing their dry bulk density. Once the dry bulk density had been measured, water was added to the graduated cylinders, and the contents of the graduated cylinders were stirred after two hours. The wet volume was measured after sitting overnight. The results are shown in Table III as Wet (ml/g).

Water Absorption Properties

Water was added to 3 grams of the comparative samples and fully cured spray-dried products in one-half gram increments with good mixing until the samples reached a sticky paste consistency or until free water was evident. The amount of water added to obtain that condition was recorded. The data is shown in Table III and is listed as Absorbency, ml/3 grams.

TABLE III

Dry and Wet Volumes and Water Absorption Properties
of UF Resin Calcium Lignosulfonate Insoluble Products

| Sample No. | Ratio UF/Lig | KCl | Drying Conditions | ml/g Dry | Wet | Absorb. ml/3 g |
|---|---|---|---|---|---|---|
| Comparative Examples | | | | | | |
| 14  | 10/1 | No  | 110° C.   | 1.3 | 2.1 | 1.5–2 |
| 15  | 10/1 | No  | RT        | 1.2 | 3.0 | 3.5–4 |
| 16  | 5/1  | No  | 110° C.   | 1.1 | 1.8 | 1–1.5 |
| 17  | 5/1  | No  | RT        | 1.2 | 2.7 | 2.5–3 |
| 19B | 10/1 | Yes | RT        | 1.0 | 1.4 | 1–1.5 |
| 19A | 10/1 | Yes | 110° C.   | 1.6 | 2.0 | 2–2.5 |
| 18  | 10/1 | Yes | 110° C.   | 1.2 | 1.6 | 2–2.5 |
| Inventive Examples | | | | | | |
| 20 | 10/1 | No | Spray-Dry | 3.2 | 9.0  | 7.5–8  |
| 21 | 5/1  | No | Spray-Dry | 5.0 | 12.5 | 9.5–10 |

As seen from Table III, even at the higher UF resin to lignosulfonate weight ratios the spray-dried products of the present invention were superior to the comparative samples.

The spray-dried products differed from the comparative samples in several ways.

Dry bulk densities were 2 to 5 times greater.
Wet bulk densities were 5–9 times greater.
Uniformity was observed to be better.
Water absorption capacities were 2–8 times greater.

The foregoing examples are for illustrative purposes only and are not intended to limit the scope of the present invention. Those skilled in the arts will recognize that various modifications may be made without departing from the spirit or scope of the invention, and it is understood that the invention is defined in the appended claims.

I claim:

1. A fertilizer composition consisting essentially of a water insoluble mixture of an urea-formaldehyde resin and a lignosulfonate wherein said composition has a weight ratio of urea-formaldehyde resin solids to lignosulfonate solids between about 1:1 and 15:1 and is prepared by mixing an aqueous urea-formaldehyde resin with a lignosulfonate to form an aqueous mixture and spray-drying the aqueous mixture to form a freely-flowing insoluble powder.

2. The composition of claim 1 which contains additional fertilizer nutrients.

3. The composition of claim 1 wherein said urea-formaldehyde resin is prepared at a formaldehyde to urea mole ratio of from about 1:1 to 6:1.

4. A method for preparing a fertilizer composition comprising (a) forming a mixture of an aqueous urea-formaldehyde resin with a lignosulfonate, wherein said mixture has a weight ratio of urea-formaldehyde resin solids to lignosulfonate solids between about 1:1 and 15:1 and (b) spray-drying the mixture to form a water insoluble powder.

5. The method of claim 4 wherein additional fertilizer nutrients are mixed with said aqueous urea-formaldehyde resin and lignosulfonate.

6. The method of claim 4 wherein said urea-formaldehyde resin is prepared at a formaldehyde to urea mole ratio of from about 1:1 to about 6:1.

* * * * *